United States Patent [19]
Puchner

[11] 3,800,396
[45] Apr. 2, 1974

[54] METHOD OF ASSEMBLING AND USING A PREARRANGED FASTENING ELEMENT PACKAGE

[75] Inventor: William R. Puchner, Elm Grove, Wis.

[73] Assignee: Charter Manufacturing Company, Inc., Milwaukee, Wis.

[22] Filed: July 21, 1972

[21] Appl. No.: 274,068

[52] U.S. Cl.............. 29/413, 29/447, 29/526, 85/DIG. 2, 206/46 H, 264/230, 287/189.36 F
[51] Int. Cl........................................... B23p 17/00
[58] Field of Search...... 29/447, 413, 526; 264/230; 151/37; 206/46 H, 56 DF, 56 A; 85/1 P, DIG. 2; 287/189.36 F

[56] References Cited
UNITED STATES PATENTS

| | | | |
|---|---|---|---|
| 2,520,259 | 8/1950 | Pummill | 29/413 UX |
| 2,593,506 | 4/1952 | Wales | 206/56 DF UX |
| 2,666,534 | 1/1954 | Dim et al. | 206/46 H UX |
| 3,198,323 | 8/1965 | Alberti et al. | 206/46 H |
| 3,313,017 | 4/1967 | Zingali | 29/446 X |
| 3,687,184 | 8/1972 | Wagner | 151/37 |

Primary Examiner—Charlie T. Moon
Attorney, Agent, or Firm—Arthur L. Morsell, Jr.

[57] ABSTRACT

A group of fastening elements such as a nut, a washer, and a lock washer are held together in axial alignment by a sleeve of shrinkable material which embraces the fastening elements and is shrunk by heat or the like to bear against the outer periphery and ends of the grouping of fastening elements. The fastening elements are prearranged in serial order to fit in cooperative relationship with a related fastening element such as a bolt. An opening is left in at least one end of the shrunk plastic sleeve so that the group of fastening elements can be assembled as a unit with the related fastening element while held in prearranged relationship by the sleeve.

3 Claims, 9 Drawing Figures

PATENTED APR 2 1974 3,800,396
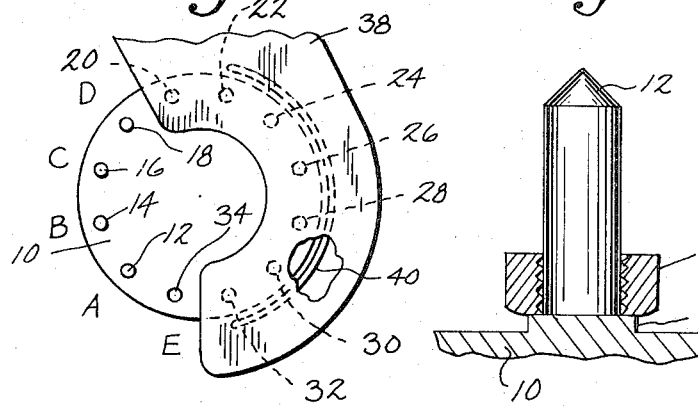
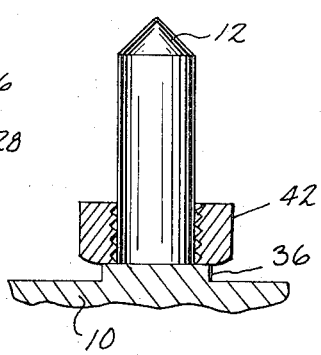
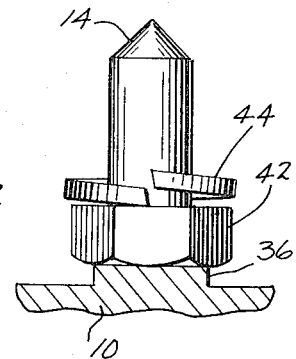
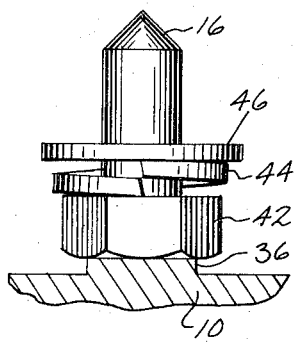
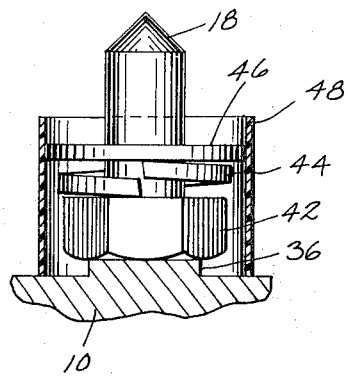
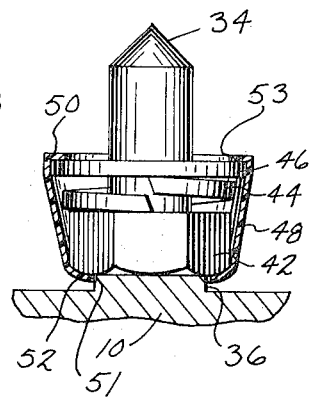
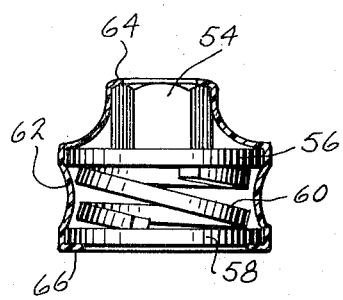
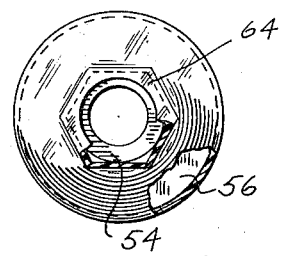
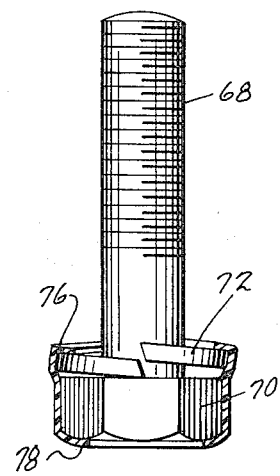

METHOD OF ASSEMBLING AND USING A PREARRANGED FASTENING ELEMENT PACKAGE

BACKGROUND OF THE INVENTION

There are countless manufactured products that are held together either wholly or in part by nuts, bolts, washers, and lock washers, or the like. In the assembly of these products, it is usually necessary to place the nuts, washers, and lock washers onto the ends of the bolts one at a time, and in order to perform this assembly operation, it is the present practice to have a container full of nuts, a container full of bolts, a container full of washers, and a container full of lock washers at the point of assembly. The different fastening elements must be extracted from their containers one after another and assembled together in proper order. This, of course, requires a multiplicity of physical movements which are relatively time consuming and which must be repeated for every fastening assembly in the product.

In addition to being relatively time consuming, the present practice is also subject to error in the order and orientation of the fastening elements. It is not unusual for a careless workman to reverse the position of the washer and lock washer on the end of the bolt. Also, washers are sometimes conical in shape and must be assembled in a predetermined orientation. Frequently this is not done properly by careless workmen.

SUMMARY OF THE INVENTION

In accordance with this invention, it has been found that the above-noted drawbacks of excessive assembly time and reversal of parts can be overcome by prepackaging a group of the fastening elements in a sleeve of shrinkable material which is inwardly stressed by the shrinking process to hold the fastening elements in prearranged order and position so that they can be handled as a unit. The prepackaged group of elements may be any group of individual elements that are adjacent to each other in the final assembly, e.g. a nut, a washer, and lock washer, a bolt with a washer or lock washer adjacent to the head of the bolt; or other combinations of elements. The fastening elements are arranged in serial order to cooperate with a related fastening element such as a bolt or a tapped opening, and an opening is left in at least one end of the shrunk plastic sleeve so that the prepackaged group of fastening elements can be assembled with the related fastening element while still held in prearranged order by the sleeve.

Accordingly, one object of this invention is to provide a prepackaged group of fastening elements which reduces the time required for assembly with a related fastening element.

A further object of this invention is to provide a prepackaged group of fastening elements which prevents the inadvertent reversing of the position of an element and prevents inadvertent change in the order of assembly of the fastening elements.

Another object of this invention is to provide a method of using and assembling fastening elements in which a prearranged group of fastening elements is held together in prearranged order and position by shrinking a plastic sleeve therearound.

BRIEF DESCRIPTION OF THE DRAWINGS

FIG. 1 is a plan view of one illustrative apparatus for assembling prepackaged fastening elements of this invention;

FIG. 2 is an enlarged side view of one mandrel of the apparatus shown in FIG. 1 at a first station where a nut is placed on the mandrel, the latter being shown in section;

FIG. 3 is an enlarged side view of another mandrel at a second station where a lock washer is placed on the mandrel over the nut;

FIG. 4 is an enlarged side view of another mandrel at a third station where a flat washer is added;

FIG. 5 is an enlarged side view of another mandrel at a fourth station where a plastic shrinkable film sleeve is slipped over the fastening elements on the mandrel;

FIG. 6 is an enlarged side view of another mandrel after the shrinkable film sleeve has been shrunk, usually by the application of heat;

FIG. 7 is a side view of a second illustrative prepackaged group of fastening elements of this invention;

FIG. 8 is a plan view of the group of fastening elements shown in FIG. 7; and

FIG. 9 is a side view of a third illustrative prepackaged group of fastening elements of this invention.

DETAILED DESCRIPTION OF THE INVENTION

FIG. 1 shows apparatus for prepackaging one illustrative embodiment of this invention. Referring to FIG. 1, a turntable 10 which is rotatably mounted on a base (not shown) by conventional means has a plurality of upstanding cylindrical mandrels 12–34 attached to the periphery thereof. Each of the mandrels 12–34 is attached at its lower end to an upstanding annular boss 36 (see FIGS. 2–6). The annular bosses 36 project upwardly from the surface of turntable 10 a predetermined distance and are larger in diameter than the inside diameter of nuts 42 thereon in order to support the nuts. The external diameter of each nut is substantially greater than the external diameter of its boss.

A suitable means for applying heat is used. One means comprises a heating hood or oven 38 covering a portion of the periphery of turntable 10, there being an arcuate electrical heating element 40 disposed above the turntable 10 to direct radiant heat toward the mandrels underneath the hood 38. The heating hood 38 and heating element 40 are supported over turntable 10 by conventional means which are not shown in the drawings. Conventional motor means (not shown) and speed reducing gearing (not shown) are coupled to turntable 10 to rotate the turntable clockwise at a speed which is properly related to an assembly process to be performed on the mandrels. As the mandrels rotate they pass work stations A–D in sequence, then pass for a relatively long period of time under heating hood 38, and then arrive at a discharge station E after emerging from the heating hood 38.

The above-noted apparatus provides an assembly line and is adapted to be used in prepackaging a nut with other elements such as a lock washer and a washer, as illustrated in FIGS. 2–6, which show enlarged side views of mandrels 12–18 and mandrel 34 at the positions shown in FIG. 1.

The first step of the assembly process occurs at work station A where a nut 42 is placed on the mandrel as shown in FIG. 2. At work station B, a lock washer 44 is placed on the mandrel over the nut 42 as shown in FIG. 3. Next, at work station C, a flat washer 46 is placed on the mandrel over lock washer 44 as shown in FIG. 4. Then, at work station D, a sleeve 48 which is made of plastic shrinkable film material is slipped over the nut 42, lock washer 44, and flat washer 46 as shown in FIG. 5.

The shrinkable film material for sleeve 48 can be any suitable shrinkable plastic such as cellulose, polyethylene, polypropylene, polyvinylidene chloride, polyethylene terephthalate, or the like. Where the film is of a type which may be shrunk by air, it may be stored in a liquid to prevent premature shrinking. It then becomes shrunk upon exposure to air after it has been placed over the assembly of fastening elements. Air curing, however, would normally take too long and require too large a turntable. To speed up the shrinking process it is preferable to apply heat to the shrinkable film either by exposing it to radiant heat or by blowing hot air against the film to shrink it. In the illustrated embodiment of the invention, the heat for shrinking the film is supplied by the electrical heating element 40 which is mounted under the heating hood 38. After leaving work station D, the mandrels carrying the preassembled fastening elements and shrinkable film sleeves 48 pass through heating hood or oven 38 and are heated by the heating element 40. As they shrink, the sleeves 48 become inwardly stressed against the outer periphery and ends of the fastening elements to hold the fastening elements together as a unit. When the fastening elements and shrunk plastic sleeve 48 emerge from heating hood 38, they pass to discharge station E, where they are removed from the mandrel in the form of FIG. 6 and are ready for use.

Referring to FIG. 6, as the plastic sleeve 48 shrinks, its lower end is drawn by the shrinking process around and under the lower end of nut 42 to form the inwardly-turned marginal end portion 52 surrounding a bottom hole 51 in the package. The upper end of the sleeve is drawn in and over the periphery of the washer 46 as at 50 forming the margin of a top hole 53 for the package. It is important that the inner periphery of inturned marginal portions 50 and 52 be larger than the central openings in nut 42 and washer 46 so that the assembly can be threaded onto a bolt by hand while still held together by the plastic sleeve 48. This is accomplished by selecting the proper height and diameter for the boss 36 (see FIG. 5) and the proper length for the unshrunk plastic sleeves 48. Since these dimensions depend upon the type of plastic material used and the shape of the elements being packaged, it is not possible to give a fixed height for the bosses 36 or a fixed length for the sleeves 48.

The nut 42, lock washer 44, and flat washer 46 are held together in axial alignment by the shrunk plastic sleeve 48 so that they can be handled as a unit and threaded onto the end of a bolt as a unit without breaking the sleeve 48. After the nut has been threaded on the bolt as far by hand as desired, the shrunk plastic sleeve 48 can then be broken so that the nut 42 can be tightened the rest of the way by a wrench.

The assembly line apparatus shown in FIG. 1 may be operated either manually or automatically, as desired. In the manual version, the fastening elements and shrinkable film sleeve are placed on the mandrels by hand. In the automatic version, the fastening elements and shrinkable film sleeves are stored in hoppers above their respective work stations and are dropped one at a time upon the mandrels as they pass under the hoppers.

The invention is not limited to nuts, lock washers, and washers. FIG. 7 shows a different preassembled package which contains a nut 54, a pair of flat washers 56 and 58, with an interposed spring 60. These fastening elements are held together in proper serial order and in axial alignment by a shrunk plastic sleeve 62 having inwardly-turned end marginal portions 64 and 66. As shown in FIG. 8, the inner periphery of end marginal portions 64 and 66 are larger in diameter than the central opening in nut 54. As noted above, this allows the unit to be threaded onto the end of a bolt without prematurely breaking the shrunk plastic sleeve 62.

FIG. 9 shows a third preassembled unit which contains a bolt 68 having a head 70 and a lock washer 72 adjacent to head 70, there being a shrunk plastic sleeve 74 embracing the bolt head 70 and lock washer 72. The shrunk plastic sleeve 74 has inwardly-turned marginal end portions 76 and 78. It will be obvious to those skilled in the art that the embodiment shown in FIG. 9 cannot be assembled on the apparatus shown in FIG. 1, but rather requires apparatus having other suitable means for supporting the bolts, or this can be done by hand.

From the foregoing description it will be obvious that this invention provides a preassembled group of fastening elements which reduces the time required for assembly with a related fastening element. And although this invention has been described in connection with several illustrative embodiments thereof, it should be understood that the invention is not limited to the disclosed embodiments since modifications can be made in the disclosed embodiments without changing their fundamental principles. This invention includes all such modifications as fall within the scope of the following claims.

What I claim is:

1. A method of using and assembling fastening elements, at least one of which has a threaded portion, comprising prearranging a plurality of said elements in axially aligned relationship and in predetermined order, shrinking a sleeve of shrinkable film material around said prearranged elements to hold said elements in position relative to one another while maintaining said threaded portion exposed, partially screwing the elements while thus held by the sleeve onto a related threaded fastening element, and thereafter breaking the sleeve and completing threaded take-up on said related fastening element.

2. A method as set forth in claim 1 in which the fastening element which has a threaded portion is a nut, and in which both ends of the hole in the nut are maintained exposed, and in which the related fastening element is a bolt.

3. A method as set forth in claim 2 in which the prearranging is on a mandrel, in which the sleeve of film material is slipped over the prearranged elements on the mandrel, and in which the sleeve is thereafter caused to shrink around the prearranged fastening elements on the mandrel.

* * * * *